United States Patent
Belinky et al.

[11] Patent Number: 5,996,869
[45] Date of Patent: *Dec. 7, 1999

[54] HITCH MOUNTED CARGO CARRIER

[75] Inventors: Jacob S. Belinky, Carleton; David L. Rogers, Canton; David A. Young, Plymouth, all of Mich.

[73] Assignee: Draw-Tite, Inc., Canton, Mich.

[ * ] Notice: This patent is subject to a terminal disclaimer.

[21] Appl. No.: 08/957,641

[22] Filed: Oct. 24, 1997

Related U.S. Application Data

[60] Provisional application No. 60/029,655, Oct. 28, 1996.

[51] Int. Cl.$^6$ .............................. B60R 9/06; B60Q 1/30
[52] U.S. Cl. .................. 224/510; 224/500; 224/521; 224/524; 224/526; 224/529; 116/28 R
[58] Field of Search ................. 224/495, 500, 224/510, 924, 521, 524, 525, 526, 527, 528, 529, 530, 534; 116/28 R

[56] References Cited

U.S. PATENT DOCUMENTS

| | | |
|---|---|---|
| 3,863,594 | 2/1975 | Gawthrop .............. 116/28 R |
| 4,823,997 | 4/1989 | Krieger . |
| 4,856,686 | 8/1989 | Workentine . |
| 4,906,015 | 3/1990 | LaCroix et al. . |
| 5,038,983 | 8/1991 | Tomososki . |
| 5,129,559 | 7/1992 | Holliday . |
| 5,169,042 | 12/1992 | Ching . |
| 5,377,886 | 1/1995 | Sickler . |
| 5,427,289 | 6/1995 | Ostor . |
| 5,460,304 | 10/1995 | Porter et al. . |
| 5,497,927 | 3/1996 | Peterson . |
| 5,520,315 | 5/1996 | Graham . |
| 5,586,702 | 12/1996 | Sadler ........................... 224/521 |
| 5,755,453 | 5/1998 | Bell ............................. 116/28 R |

*Primary Examiner*—Linda J. Sholl
*Attorney, Agent, or Firm*—Leon E. Redman; Lloyd D. Doigan

[57] ABSTRACT

A cargo carrier platform for mounting to a vehicle hitch allowing cargo to be transported outside the vehicle. The cargo carrier includes a drawbar adapted to be received within the vehicle hitch and a cargo platform adjustably attached to the drawbar to facilitate fore and aft adjustment of the platform relative to the rear of the vehicle. The drawbar is provided with a vertical offset to position the platform further from the ground. Markers are mounted on the outer rear corners of the platform to provide the user with a continuous visual indication of the extent of the cargo carrier.

16 Claims, 5 Drawing Sheets

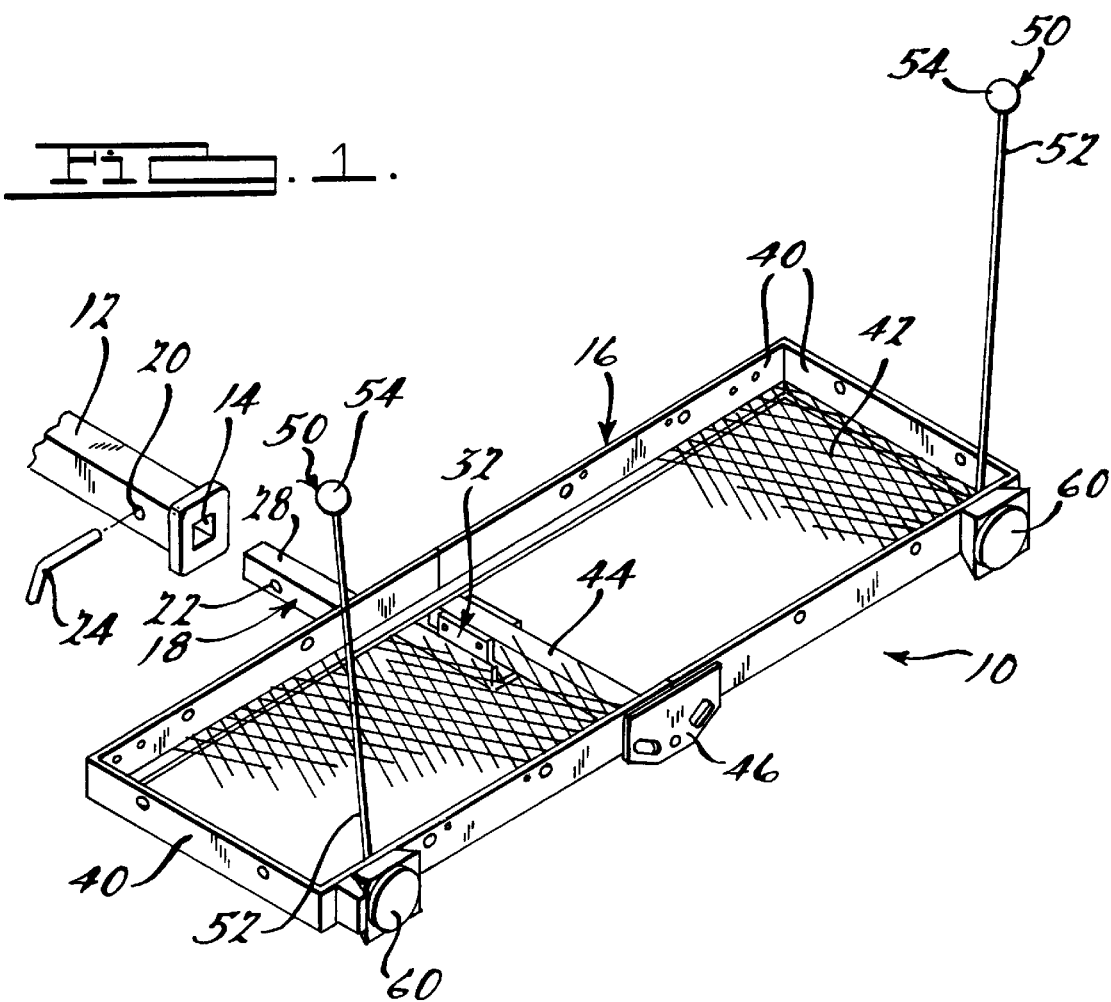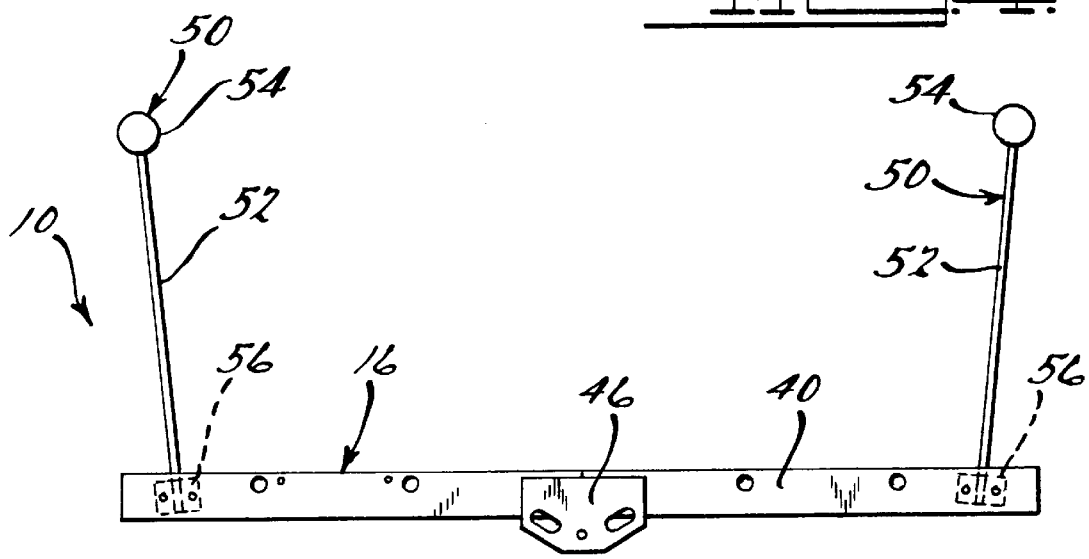

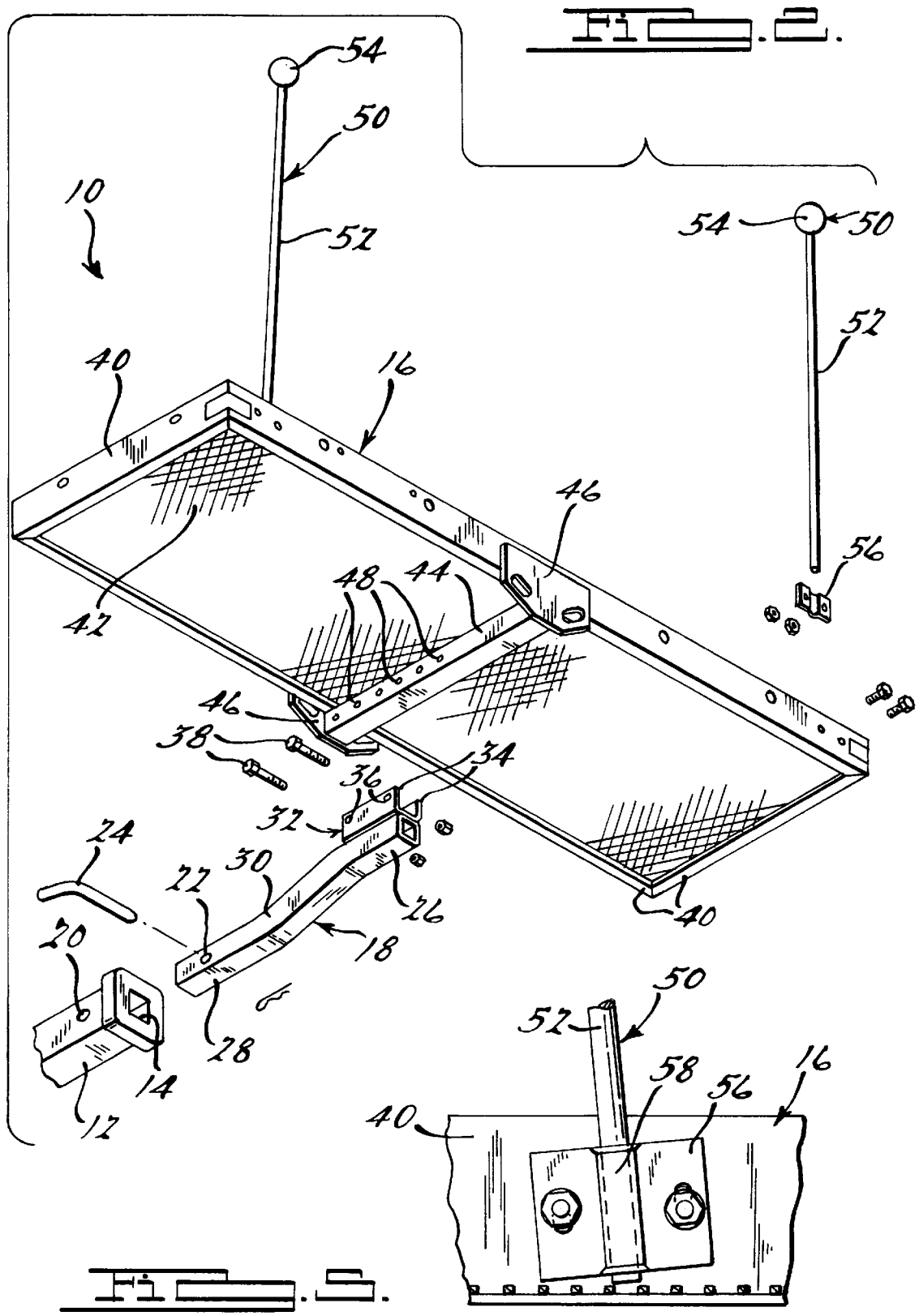

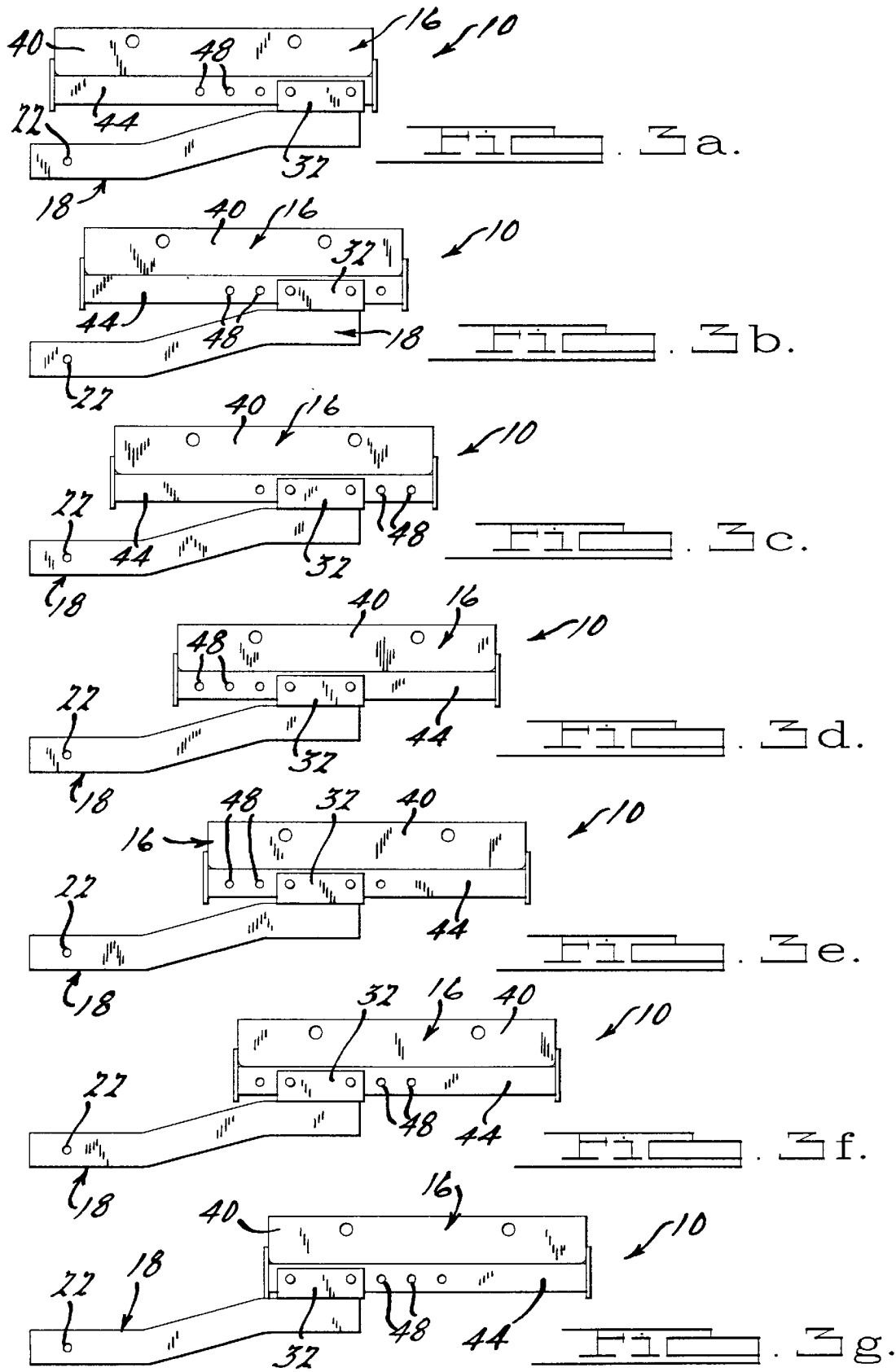

HITCH MOUNTED CARGO CARRIER

This application claims priority from U.S. Provisional Application No. 60/029,655 filed on Oct. 28, 1996.

BACKGROUND OF THE INVENTION

I. Field of the Invention

This invention relates to cargo carriers for vehicles and, in particular, to a hitch mounted carrier capable of adjustment fore and aft relative to the vehicle to optimize the position of the carrier platform.

II. Description of the Prior Art

Article carriers are widely employed to expand the carrying capacity of vehicles while maintaining comfort within the passenger compartment. Rooftop carriers are well known although access can be cumbersome particularly with taller vehicles. Moreover, rooftop carriers are dependent upon the structural strength of the vehicle roof and therefore may be limited in their carrying capacity. Rear mounted cargo carriers have also been employed to increase the cargo capacity of the vehicle. Many require specialized mounting hardware to secure the carrier to the vehicle resulting in undesirable added structure and cost. Some of the prior known cargo carriers are attachable to the vehicle hitch but do not provide any flexibility in the positioning of the carrier to accommodate the wide variety of vehicle configurations. Cargo platforms which simply extend from the hitch assembly could be damaged by contact with the ground as the vehicle moves along an inclined surface such as a driveway. Similarly, the rear portion of the vehicle may include obstructions to full utilization of the carrier such as the spare tire on utility vehicles. It is desirable to optimally position any cargo carrier to ensure full capacity yet minimize the cantilever forces applied to the hitch assembly.

SUMMARY OF THE PRESENT INVENTION

The present invention overcomes the disadvantages of the prior known cargo carriers by providing a platform which is adjustably attached to a vertically offset drawbar received in the vehicle hitch assembly to allow selective positioning of the platform relative to the vehicle while also raising the platform to increase ground clearance.

The hitch mounted cargo carrier generally comprises a drawbar removably received by a vehicle hitch assembly and a cargo platform adjustably attached to the drawbar. The drawbar has a vertical offset in order to raise the platform above the hitch for increased ground clearance. The outer end of the drawbar includes a bracket for receiving a central beam of the cargo platform. The platform is removably connected to the drawbar bracket by fasteners which extend through apertures in the bracket and one of a plurality of apertures disposed longitudinally along the beam. The position of the platform relative to the drawbar and therefore the rear of vehicle may be adjusted by utilizing different apertures along the central beam. In a preferred embodiment, the apertures extend only along a portion of the beam to reduce manufacturing costs. However, positioning along the full width of the platform can be accomplished by rotating the platform 180° to utilize the apertures.

A preferred embodiment of the platform includes a rectangular frame secured to the central beam and a mesh support surface to minimize accumulation of moisture. Reflectors or lights electrically connected to the vehicle taillights may be mounted along the rear edge of the frame. In order to provide a visual indication of the location of the cargo carrier, corner markers are attached to the platform. The markers extend upwardly from the platform and are positioned directly over the outer corners of the carrier so as to be seen through the windows and rear view mirrors of the vehicle.

Other objects, features and advantages of the invention will be apparent from the following detailed description taken in accordance with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a perspective view of a cargo carrier embodying the present invention and adapted to be mounted to a vehicle hitch;

FIG. 2 is an exploded view of the cargo carrier;

FIGS. 3a through 3g illustrate various mounting positions of the platform relative to the drawbar of the cargo carrier;

FIG. 4 is a rear elevational view of the cargo carrier;

FIG. 5 is an enlarged view of a mounting bracket for the corner markers of the cargo carrier;

DETAILED DESCRIPTION OF PREFERRED EMBODIMENT OF THE PRESENT INVENTION

Figure 6:
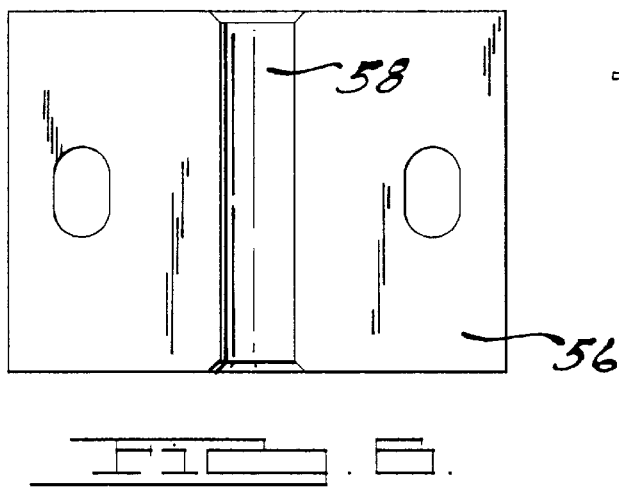
FIGS. 6 through 8 illustrate a first embodiment of the corner marker bracket.

Referring first to FIGS. 1 through 4, there is shown a cargo carrier 10 for mounting to a hitch assembly 12 of a vehicle (not shown). Preferably, the hitch assembly 12 is a receiver style hitch having a sleeve 14 fixedly mounted to the vehicle. The hitch assembly 12 extends rearwardly from the vehicle in order to position the cargo carrier 10 proximate the rear bumper of the vehicle for convenient access and loading of the carrier 10. In accordance with the present invention, the cargo carrier 10 may be removed to allow use of the hitch 12 for towing purposes.

The cargo carrier 10 generally includes a platform 16 adjustably connected to a drawbar 18 adapted to be matingly received within the hitch sleeve 14. The hitch sleeve 14 and drawbar 18 include apertures 20,22 for receiving a locking pin 24 to secure the drawbar 18 within the hitch sleeve 14. As a result, the drawbar 18 extends longitudinally from the hitch 12 rearwardly of the vehicle. The drawbar 18 of the preferred embodiment is provided with a vertical offset such that an outer end 16 of the drawbar 18 is disposed higher than an inner end 28 received within hitch 12. Extending between the outer end 16 and inner end 28 is an angled intermediate portion 30 to form the offset. Secured to the outer end 26 of the drawbar 18 is a mounting bracket 32. In a preferred embodiment, the mounting bracket 32 is U-shaped with upwardly extending side walls 34 having apertures 36 for receiving appropriate fasteners 38. However, alternative bracket configurations may be utilized. The vertical offset of the drawbar 18 is designed to raise the cargo platform 16 relative to the ground for increased clearance.

The platform 16 preferably includes a rectangular frame 40 with a metal mesh bottom 42 supported on a central beam 44. Reinforcement plates 46 may be used to further secure the central beam 44 to the frame 40. The metal mesh bottom 42 prevents water from accumulating within the platform 16 although a substantially solid bottom could be utilized. The central beam 44 of the platform 16 is intended to be removably received within the bracket 32 of the drawbar 18. The central beam 44 includes a plurality of throughbores or apertures 48 preferably along only a portion of the length of the central beam 44. The apertures 48 define discrete mounting positions of the platform 16 to the drawbar bracket 32 in order to optimally position the cargo platform 16 relative to the rear of the vehicle. As best shown in FIGS. 3a through 3g, the position of the platform 16 relative to the drawbar 18, and therefore, relative to the hitch 12 and the rear of the vehicle, can be altered by securing the bracket 32 to different apertures 48 along the central beam 44. The platform 16 can be disposed in close proximity to the hitch 12 as shown in 3a and progressively outwardly along the apertures 48. In the event the platform 16 must be positioned still further away from the hitch, the platform 16 can be rotated 180 degrees as shown in 3d–3g to utilize the apertures 48 of the beam 44 in an alternative orientation. FIG. 3g shows the platform 40 at the extreme cantilevered position. Although the adjustment feature allows the cargo carrier 10 to fit a greater number of vehicles, it is preferred that the platform 16 be positioned close to the vehicle bumper to reduce the stress on the hitch assembly 12.

Figure 7:
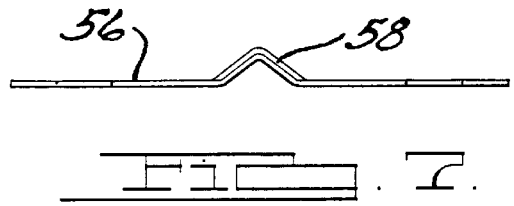
Figure 8:
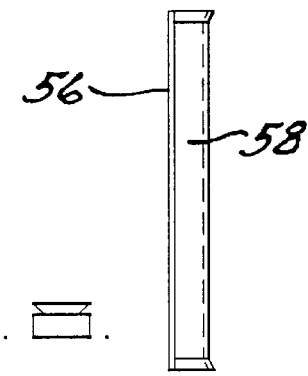
Figure 9:
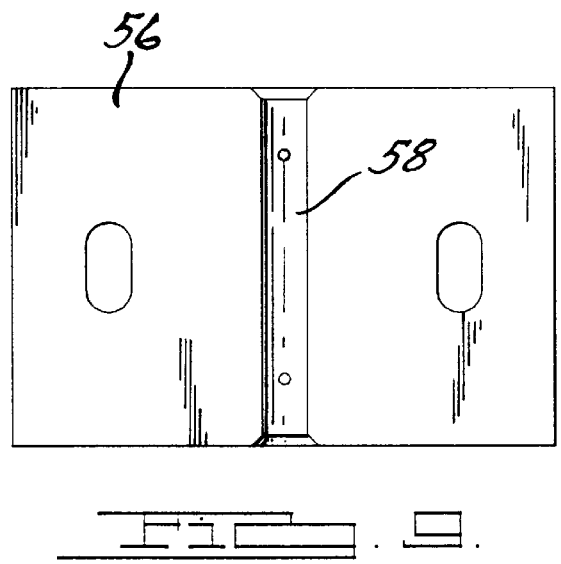
FIGS. 9 through 11 illustrate a second embodiment of the corner marker bracket.
Figure 11:
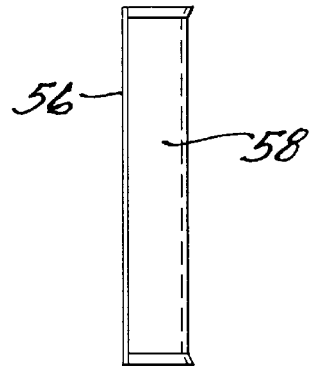
Figure 10:
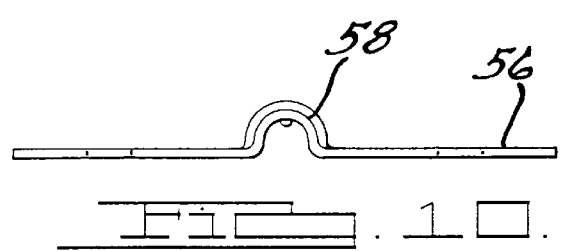
Figure 12:
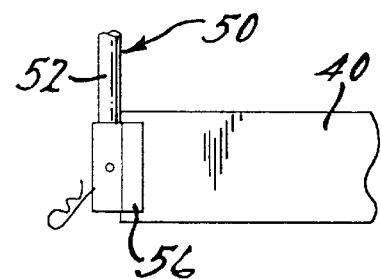
FIGS. 12 and 13 illustrate a third embodiment of the corner marker bracket.
Figure 13:
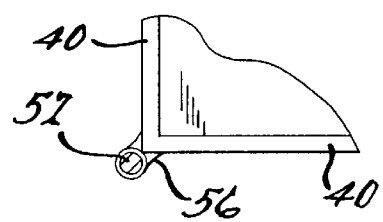
Figure 14:
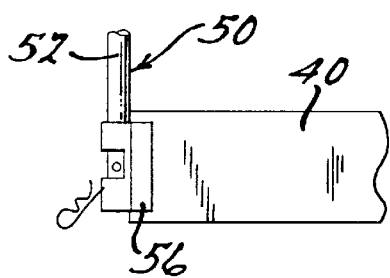
FIGS. 14 and 15 illustrate a fourth embodiment of the corner marker bracket.
Figure 15:
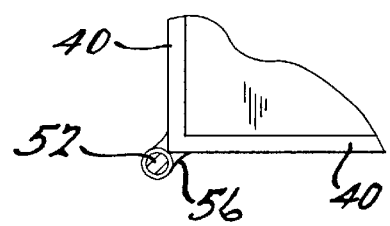
Figure 16:
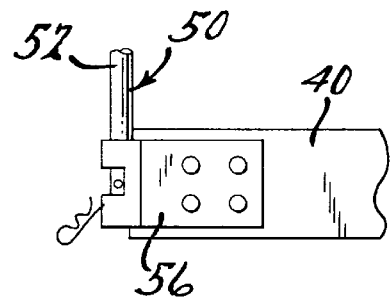
FIGS. 16 and 17 illustrate a fifth embodiment of the corner marker bracket.
Figure 17:
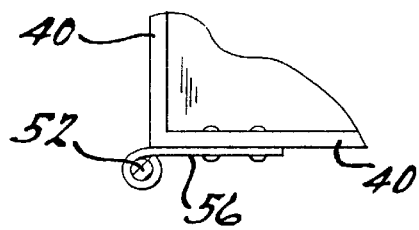
Figure 18:
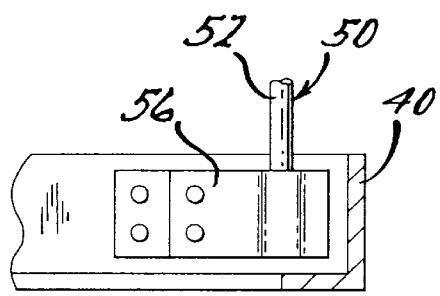
FIGS. 18 and 19 illustrate a sixth embodiment of the corner marker bracket.
Figure 19:
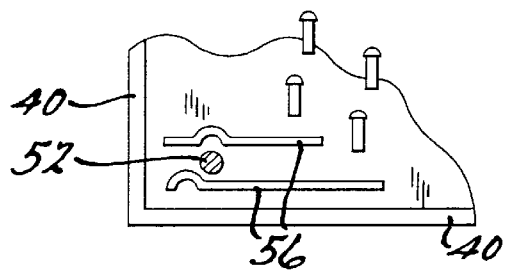

An additional feature of the present invention is the visual markers 50 attached to the platform 16 to provide a continuous indication of the position of the outer corners of the cargo carrier 10 as shown in FIGS. 4 through 19. The markers 50 generally include a relatively stiff but flexible shaft 52 having an indicator 54, such as a brightly colored sphere mounted to an upper end. The lower end of the shaft 52 is attached to the platform 16 by a mounting bracket 56 preferably fastened to the frame 40. Each embodiment of the bracket 56 is designed to position the indicator 54 directly over the outer corner of the platform frame 40. The first and second embodiments of the bracket 56 shown in FIGS. 6–8 and FIGS. 9–11, respectively, are designed to be mounted inwardly of the true corner. As shown in FIG. 5, these brackets 56 include a partial sleeve 58 oriented at an angle to vertical in order to position the indicator 54 over the corner. The brackets 56 shown in FIGS. 12 through 17 position the entire marker 50 at the corner of the platform 16. The markers 50 provide a constant visible reminder of the location of the cargo carrier. The shaft 52 of the markers 50 is of sufficient length to allow the indicator 54 to be seen by the driver of the vehicle. The markers 50 may be removed from the bracket 56 for storage, while loading the cargo carrier, or when the carrier load interferes with the corner markers 50.

The cargo carrier 10 may also be provided with reflectors or lights 60 to provide other drivers with a visual indication of the cargo carrier 10. Any reflector may be as simple as reflective tape secured to the platform frame 40. The lights 60 can be electronically connected through the lighting harness used while towing trailers to operate the lights in conjunction with the tail lights of the vehicle.

The foregoing detailed description has been given for clearness of understanding only and no unnecessary limitations should be understood therefrom as some modifications will be obvious to those skilled in the art without departing from the scope and spirit of the appended claims.

What is claimed is:

1. A cargo carrier adapted to be mounted to a hitch sleeve of a vehicle to position said cargo carrier proximate the rear of the vehicle, said cargo carrier comprising:

a drawbar having a first end adapted to be selectively received within the vehicle hitch sleeve and a second end, said second end including a bracket;

a cargo platform adjustably mounted to said bracket of said drawbar wherein said cargo platform is selectively adjustable fore and aft relative to said bracket of said drawbar to optimize positioning of said cargo platform relative to the rear of the vehicle;

said cargo platform has a central beam received by said bracket, said central beam having a means for selectively engaging said bracket along a plurality of discrete positions to adjust the position of said platform relative to said drawbar;

said bracket includes a U-shaped bracket having an end wall mounted to said second end of said drawbar and a pair of side walls extending upwardly from said end wall and drawbar, said central beam received between said side walls of said U-shaped bracket.

2. The cargo carrier as defined in claim 1 wherein said drawbar includes a vertical offset such that said second end is disposed at a height greater than said first end.

3. The cargo carrier as defined in claim 2 wherein said drawbar includes an angled intermediate segment disposed between said first and second ends to form said vertical offset.

4. The cargo carrier as defined in claim 1 wherein said discrete positions are formed by a plurality of apertures along said central beam.

5. The cargo carrier as defined in claim 4 wherein said apertures defining said discrete positions are formed along only a portion of said central beam.

6. The cargo carrier as defined in claim 1 wherein said cargo platform includes a substantially rectangular frame mounted to said central beam and a bottom wall within said frame.

7. The cargo carrier as defined in claim 6 and further comprising visual markers removably mounted to said platform frame and extending upwardly to provide a visual indication of the location of said cargo carrier.

8. The cargo carrier as defined in claim 6 and further comprising illumination means mounted to said platform frame to provide a visual indication of the location of cargo carrier.

9. A cargo carrier adapted to be mounted to a hitch sleeve of a vehicle to position said cargo carrier proximate the rear of the vehicle, said carrier comprising:

a drawbar having a first end adapted to be selectively received within the vehicle hitch sleeve and a second end vertically offset relative to said first end such that said second end is disposed at a height greater than said first end, said second end including a bracket;

a cargo platform having a frame and a central beam, said central beam lockingly received by said bracket to mount said platform to said drawbar, said central beam adjustably mounted to said bracket such that said platform is selectively adjustable fore and aft relative to said drawbar to optimize positioning of said cargo platform relative to the rear of the vehicle; and said central beam of said cargo platform includes a plurality of apertures defining discrete positions along said beam, said bracket lockingly engaging said central beam at one of said discrete positions whereby said cargo platform is adjustably mounted to said drawbar along a plurality of discrete positions.

10. The cargo carrier as defined in claim 9 wherein said apertures extend along only a portion of the length of said central beam.

11. The cargo carrier as defined in claim 9 wherein said bracket includes a U-shaped bracket having an end wall mounted to said second end of said drawbar and a pair of side walls extending upwardly from said end wall and drawbar, said central beam received between said side walls of said U-shaped bracket.

12. The cargo carrier as defined in claim 9 and further comprising visual markers mounted to said platform frame and extending upwardly to provide a visual indication of the location of said cargo carrier.

13. The cargo carrier as defined in claim 12 wherein said visual markers include a shaft having an indicator at an upper end thereof, a lower end of said shaft secured to said platform by a mounting bracket.

14. The cargo carrier as defined in claim 13 wherein said mounting bracket is secured to said platform frame inwardly of a side edge of said frame, said mounting bracket maintaining said visual marker at an angle to position said indicator above said side edge of said frame.

15. The cargo carrier as defined in claim 13 wherein said mounting bracket is secured to an outer corner of said platform frame to position said indicator above said outer corner of said frame.

16. The cargo carrier as defined in claim 9 and further comprising illumination means mounted to said platform frame to provide a visual indication of the location of said cargo carrier.

* * * * *